(12) United States Patent
Achanta et al.

(10) Patent No.: US 7,519,809 B2
(45) Date of Patent: Apr. 14, 2009

(54) OPERATING SYSTEM-WIDE SANDBOXING VIA SWITCHABLE USER SKINS

(75) Inventors: Phani Gopal V. Achanta, Austin, TX (US); Riaz Y. Hussain, Austin, TX (US); Scott Thomas Jones, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 917 days.

(21) Appl. No.: 11/101,612

(22) Filed: Apr. 7, 2005

(65) Prior Publication Data

US 2006/0229741 A1    Oct. 12, 2006

(51) Int. Cl.
*G06F 1/24* (2006.01)
(52) U.S. Cl. .......................... 713/100; 713/1
(58) Field of Classification Search ............. 713/1, 713/2, 100, 165, 167, 188
See application file for complete search history.

(56) References Cited

U.S. PATENT DOCUMENTS

| | | | |
|---|---|---|---|
| 6,691,230 B1 * | 2/2004 | Bardon | 726/27 |
| 7,398,400 B2 * | 7/2008 | Wiseman | 713/188 |
| 2002/0023225 A1 | 2/2002 | Lomnes | |
| 2003/0126136 A1 * | 7/2003 | Omoigui | 707/10 |
| 2003/0149895 A1 | 8/2003 | Choo et al. | |
| 2004/0078568 A1 | 4/2004 | Pham et al. | |
| 2004/0205772 A1 * | 10/2004 | Uszok et al. | 719/317 |
| 2005/0169073 A1 * | 8/2005 | Cook et al. | 365/202 |
| 2005/0172279 A1 * | 8/2005 | Cook et al. | 717/162 |
| 2006/0230454 A1 * | 10/2006 | Achanta et al. | 726/24 |

\* cited by examiner

*Primary Examiner*—Chun Cao
(74) *Attorney, Agent, or Firm*—Diana R. Gerhardt; Dillon & Yudell LLP (57) ABSTRACT

A method and system that provides a pass through block device that is utilized to redirect all the writes bound to the system drive(s) to an overlay skin device. Reads are performed on overlay device contents and the overlay device contents take precedence over the contents of the base device. Applications of a particular theme may be installed on the overlay device. The overlay device is provided on a removable media and thus allows for creation of a set of exchangeable skins. Nested overlays are utilized to create separation of the OS data, application data, and user data. Switchable user skins enable writes into overlays and allow a user to create operating environments which can be utilized to change the use of a computer system. Since the overlays are provided on a removable media, the user only needs to substitute the overlay to switch the user's operating environment.

1 Claim, 9 Drawing Sheets

OPERATING SYSTEM-WIDE SANDBOXING VIA SWITCHABLE USER SKINS

CROSS REFERENCE TO RELATED APPLICATIONS

The present invention is related to the subject matter of commonly assigned, co-pending patent application, Ser. No. 11/101,613, filed concurrently herewith. The content of the related application are incorporated herein by reference.

BACKGROUND OF THE INVENTION

1. Technical Field

The present invention relates generally to computer systems and more specifically to use of sandboxing techniques within computer systems. Still more particularly, the present invention relates to a method and system for extending sandboxing functionality to enable use of switchable skins at the base operating system level of computer systems.

2. Description of the Related Art

A computer-implemented method known as "sandboxing" has recently been developed to allow a software program to be executed within a controlled environment in which the program is prevented from accessing system-wide operations that could damage the computer system. Sandboxing generally refers to enforcing restrictions on a specific instruction or a sequence of instructions and provides a way of preventing direct physical corruption of data and applications on a computer system (or OS processes).

One sandboxing technique involves a computer system executing (i) a pre-defined prologue before all executions of a specific instruction (e.g., write instructions) and/or (ii) a pre-defined epilogue thereafter. To implement this sandboxing technique, an assembly language programmer adds code to an application program immediately before each write instruction to ensure that the instruction is not affecting "protected space." With this technique, data enters a computer system, but the sandboxing code constrains the way in which the data can be used within the system environment. Should the data contain a Trojan Horse or virus (i.e., malicious software), the malicious software has access only to the constrained environment and the data does not corrupt software applications (or system functions) outside that constrained environment, i.e. beyond the sandbox boundary. With current sandboxing techniques, a system is able to return to known states because sandboxing allows the separation of the changes from the base application and a return to the known state (i.e., the state just prior to implementing the sandbox to execute the particular code).

The most common form of sandboxing is that provided for JAVA.RTM applets, which are self contained elements of software written in JAVA (a language developed and trademarked by Sun Microsystems) that can be executed on a wide variety of different types of computers. One example of a JAVA application that supports sandboxing is "Java virtual machine" (a trademark of Sun Microsystems), which utilizes the technique so that untrusted applets (such as those downloaded from the Internet) can be executed in a constrained environment.

Current sandboxing techniques are limited to the application level, i.e., current sandboxing is limited to a particular application and applies to specific types of files or data (e.g., received email). Some file systems map individual drives on to each other in a nested configuration to achieve application-level sandboxing. Other technologies boot a system with an initial boot drive, and then switch to an alternate drive to perform sandboxing. While these implementations provide some level of post boot security, the sandboxing technique is still limited to a particular application and applies only to specific types of files or data.

A few general-purpose sandboxes have been built or proposed. For example, a research software named Janus is described in a paper entitled "*Janus: An approach for Confinement of Untrusted Applications*", David A Wagner, UC Berkeley Computer Science Division, report CSD-99-1056, August 1999. This software utilizes security features within an operating system to separate software executing within the sandbox from other software executing on a computer system in the form of a main workstation desktop.

Further, United States Patent Application No. 20040139334 provides a sandbox application for receiving potentially harmful data and defining a sandbox desktop, characterized in that it also includes program code for encrypting potentially harmful data to render the data harmless and code for decrypting encrypted data for processing by an application constrained by the sandbox application. Important messages are not delayed awaiting expert inspection, but are instead made available to a system user in a constrained quarantine environment provided by a sandbox desktop.

Another recent development in the computer arts is the use of application-level "skins" to customize the interface of a particular application to a user's design. Skins are layers of visual and auditory interfaces that a user is able to place over an existing application to customize the user interface of the application. For example, the Winamp application (found at Internet site "www.winamp.com") and music jukebox applications (found at Internet site "www.musicmatch.com") provide a "change skin" feature that enables the user to change the visually representation of the application by placing a skin of data above the existing application. This skin of data is local level data, which may be discarded. Use of the skin offers protection to the underlying application code since the changes occur only within the skin and no changes/corruption occurs to the specific application data within the underlying application code.

Use of both sandboxing and/or skins, however, occur on the application-level. Also, sandboxing techniques predominantly find their application in the area of test environments that discard new generated data after a test run. Neither sandboxing nor the use of skins have been applied to more generalized use such as providing protection beyond a single application and supporting a comprehensive system-wide skin overlay (versus an application-level skin) covering the base system and/or entire operating system space.

The present invention thus recognizes that it would be desirable to provide system-level sandboxing functionality via a system-wide skin overlay of the entire base operating system rather than just an application-specific skin (or application-level sandboxing) so that no leakage in the protection of the base system occurs, as is possible when implementing sandboxing for select application(s). The invention further recognizes the desirability of being able to provide removable/portable skins and multiple levels of these system-wide skins. Enabling a user to customize an entire computer system with one or more portable operating system-wide skins that are installable over any computer system would be an advantageous improvement. Finally, it would be further desirable to have hardware support for adding skins directly to the hard drives of a computer system and autonomically implementing sandboxing protections based on a detected hardware configuration. These and other benefits are provided by the invention described herein.

SUMMARY OF THE INVENTION

Disclosed is a method and computer system that provides operating system-wide skins that cover the entire base system of a computer to provide system-level sandboxing protection of the entire base OS space. The basic input output system (BIOS) of the computer system enables one or more skins to cover the entire base system in a manner that is transparent to the operating system. Multiple layers of system-wide skins are so provided, with each skin possibly provided on a separate removable medium or as a partition on the same media. When the skin is provided via removable media, the removable media enables portability of the skins across computer systems. The user simply "peels off" the skin and ports the skin to another computer system of similar base configuration, as desired.

The invention provides a pass-through block utility (or skin utility) that includes code that redirects all write/update/installation operations bound to the base system drive(s) to a separate drive/storage medium that serves/operates as an overlay (skin) device. The pass-through block utility creates a complete system-wide overlay (or skin).

Any writes/updates/installations generated on the computer system are directed to the separate drive/storage medium of the skin, such that no updates are actually made to the base system while the system-wide skin is present. Read operations are first directed to the overlay device and are forwarded to the base system drive only if the requested data/file is not present within the overlay device environment (or skin level). Accordingly, all data updates, application or software utility installations, downloads, as well as any moves of files and/or data take place within the skin level, and no actual updates occur on the base system level while a system-wide skin is in place.

In the embodiment in which the skin is provided by a separate, removable media, multiple exchangeable/switchable skins may be provided over the base system level. The switchable skins may be created and stored on a removable medium such as a removable CD ROM, DVD, thumb drive, or flash drive. Because all writes/updates/installations occur at the skin level on a removable media, the user is able to port the changed skin away from the current computer system and build them on to a different computer system.

One hardware configuration that supports the implementation of a system-wide skin includes a hard disk drive interface (or controller) with a connection port for connecting a removable media on which the skin is provided. This media may then be ported to another computer system and connected directly to the hard disk drive controller of the other computer system. Firmware associated with the connection port (or BIOS) registers the removable media during boot up and triggers a pass-through block utility to implement system-wide skin functionality supported by the BIOS and device drivers of the computer system.

In some implementations, the system-wide skin also includes a copy of certain operating system files and/or operating system functionality. The operating system functionality enables the skin to function independent of any base operating system, particularly when the skin is being ported to different computer systems having different operating systems.

In another embodiment the system-wide skin has installed thereon specific types of applications, program modules, and data associated with a particular theme (e.g., business or game themes). A system-wide skin that includes operating system components that provide support for applications contained on the skin is referred to as an operating environment skin. The creation of an operating environment skin on a portable medium may then be utilized to change the use/functionality of different computer systems. For example, the presence of OS components and other applications for providing games at the skin level results in a computer system on which the skin is provided to providing a game operating environment.

As another example, the user may provide a business operating environment overlay that contains all of the user's office-tailored applications installed thereon. Because these overlays may be provided on a removable medium, the user is able to switch the operating environment of a standard computer system by connecting/inserting the removable medium containing the desired skin and thus adding or substituting a system-wide skin with independent executable functions. The base system and operating system are not aware that the skin is present, because the skin is transparent to the operating system. Only the specific pointers of the device drivers within the BIOS are changed in the background, and so from the perspective of the operating system, processing is still being completed at the base system level and the base system drives are still being accessed and updated during the processing. Files that are modified within the skin level become new/updated files within the skin level only (on the skin's storage medium). No modification occurs at the base operating system level (i.e., on the base system drive).

Because of the transparency of the skin and the ability of each skin to provide a different operating environment and/or application, multiple layers of skins may be simultaneously added using a combination of different, removable media or different partitions on the system drive. With these multiple skins available, the pass through block utility is programmed to support/enable nested overlays of skins, which are utilized to create separation of OS data, application data, and user data. With nested skin-levels, multiple system-wide skins are simultaneously placed over the base system with the highest level skin (i.e., the last skin added on top of the base system) being the one at which the user is currently operating/interacting and all current updates are performed.

Thus, when accessing applications/data to perform read or write functions in a system supporting multiple levels of system-wide skin, the device driver of the system drive first points to the highest level skin to obtain data rather than accessing the base system. writes/updates/installations are all performed within that highest level skin. Since each skin is system-wide, the base system level and each intermediate skin level is thus protected from possible corruption from operations (changes/updates/installations) occurring in the skin level immediately above it. Read operations, however, occur at any level at which the data is available beginning with a search at the highest level skin and checking subsequent levels in sequence until the base system is checked (i.e., if data is not found in one of the skin levels).

In one implementation, a user is allowed to provide a setup file at boot time, which sets up privilege levels (read, write, hidden) on a per directory and per skin basis, thus allowing the user to exercise finer control on the operating environment.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method and computer system that provides base operating system-wide skins that cover the entire base system of a computer to provide system-wide protection of the base OS space (rather than application level protection). In one embodiment, a pass through block utility within the computer system redirects all write instructions bound to the system drive (e.g., C: drive in Windows OS) to a separate drive/media referred to as a "skin" drive The basic input output system (BIOS) of the computer system enables one or more skins to be placed over the base system in a manner that is transparent to the base operating system. Multiple layers of system-wide skins are so provided, with each skin possibly provided on a separate removable medium or as a partition on the same media. When the skin is provided via removable media, the removable media enables portability of the skins across computer systems. The user simply "peels off" the skin and ports the skin to another computer system of similar base configuration, as desired. A typical use for such skins would be in a public computing environment like a library which has systems with the same base configuration and the user can bring a skin to get a customized environment.

The invention expands the capability of sandboxing and utilization of application skins from the application-specific implementations to a more comprehensive implementation in which a system-wide skin is provided and overlays the data/files/applications (etc.) of the base computer system. The invention enables two levels of storage, a read-only base system level and a read-write system-wide skin level.

The invention provides at least one execution layer above the level of the base operating system. A read-write skin level is a transparent layer (i.e., the executing application is unaware that read and/or write operations are not completed on the medium hosting the base OS, from which only read access is allowed wile the skin is in place). The read-write skin level serves as the default level for all read, write, activation, and other user interface requests, with the base system level serving solely as a backup for read access requests. If the skin does not have support for the particular requests, then the OS transfers the request down to the base system level for processing. Thus, when a user accesses an application on the system or carries out any process that requires an update to data, which may exist at the system drive, the executing OS first examines the skin level to determine if the application/process is able to be executed at the skin level, without ever updating the underlying base system. The user may run applications at the base system level but provides no updates to the base components of those applications. Rather, the processor executes the executable code of the application within the skin level and the OS maintains/stores the changes to structures (data/file) generated by the application within the skin level.

In one implementation, application of the invention allows a user to provide a setup file at boot time, and the setup file sets up privilege levels (read, write, hidden) on a per directory and per skin basis thus allowing the user to exercise finer control on the operating environment.

Computer System Hardware/Software Overview

Figure 1:
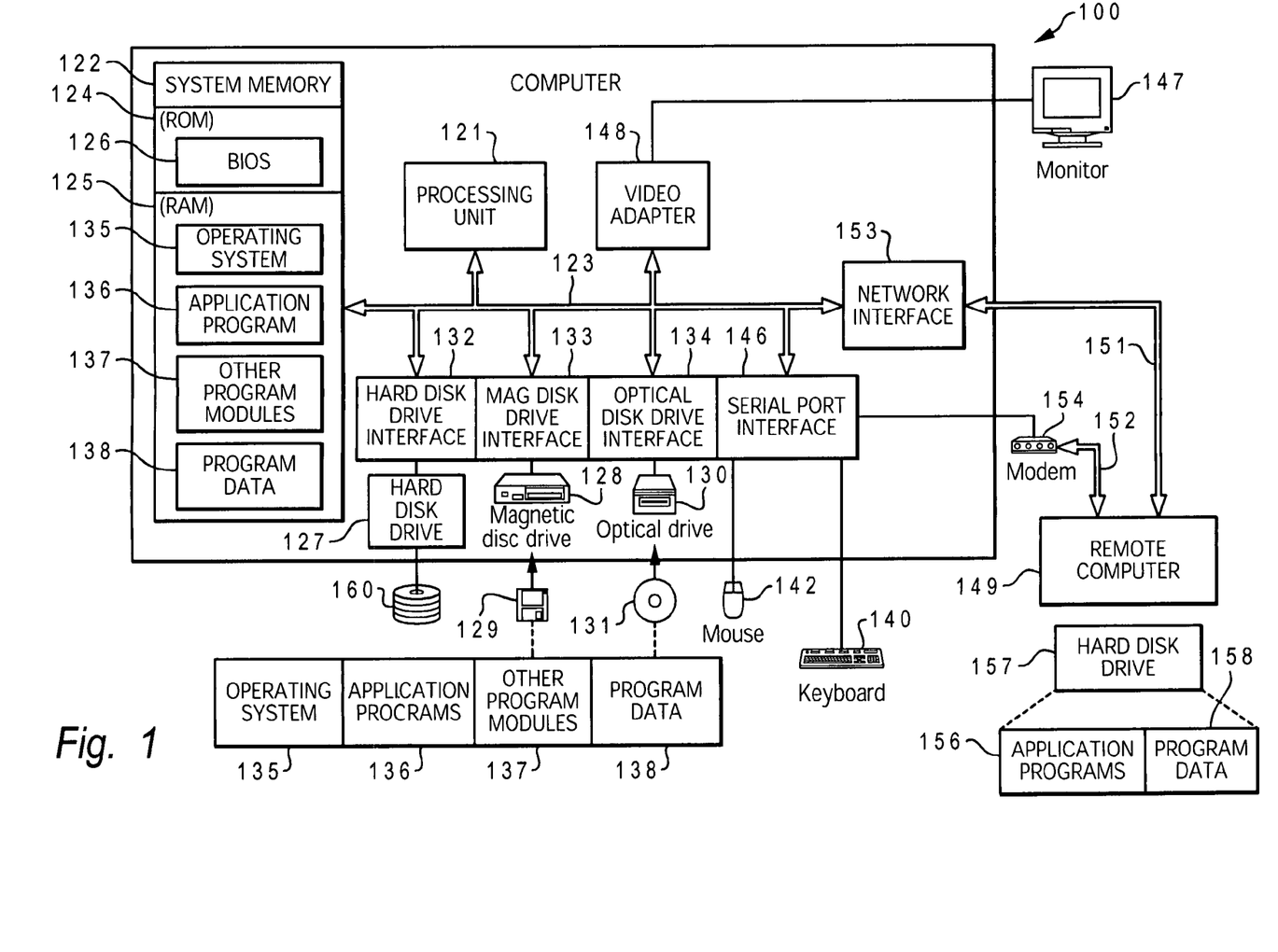
FIG. 1 is a block diagram of a computer system within which the various features of the invention may advantageously be implemented.

The invention is preferably implemented in a computer system, similar to computer system 100 illustrated by FIG. 1. The description of FIG. 1 is intended to provide a brief, general description of suitable computer hardware and a suitable computing environment within which the invention may be implemented. Although not required, the invention is described in the general context of computer-executable instructions, such as program modules, being executed by a computer, such as a personal computer. Generally, program modules include routines, programs, objects, components, and data structures that perform particular tasks or implement particular abstract data types.

As utilized herein, a utility may be a hardware utility or software utility or a combination of both hardware and software components. The term "skin" interchangeably refers to a software construct that covers the base system layer and the hardware medium (also referred to as an overlay device) on which the software construct exists and the skin-level functions are completed. These skin level functions include execution of an application, storage of all updates/data generated during execution of an application while the skin is in place and retrieval of data from the skin medium when the application provides a read operation.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules such as skin functionality, may be located in both local and remote memory storage devices.

With specific reference now to the figures, and in particular to FIG. 1, there is illustrated an exemplary computer system within which the functions of the invention may advantageously be implemented. Computer system 100 includes a processing unit 121, system memory 122, and system bus 123 that couples various system components including system memory 122 to processing unit 121. System bus 123 may be any of several types of bus structures including a memory bus or memory controller, a peripheral bus, and a local bus using any of a variety of bus architectures. System memory 122 includes read only memory (ROM) 124 and random access memory (RAM) 125. A basic input/output system (BIOS) 126, stored in ROM 124, contains the basic routines that help to transfer information between elements within the computer system 100 and recognize and configure device drivers for hardware devices, such as hard drives, during boot-up of the computer system 100.

Computer system 100 further includes hard disk drive 127 for reading from and writing to hard disk 160, magnetic disk drive 128 for reading from or writing to removable magnetic disk 129, and optical disk drive 130 for reading from or writing to a removable optical disk 131 such as a CD ROM, DVD, or other optical media. Hard disk drive 127, magnetic disk drive 128, and optical disk drive 130 are connected to system bus 123 by hard disk drive interface 132, magnetic disk drive interface 133, and optical disk drive interface 134, respectively. The drives and their associated computer-readable media provide nonvolatile storage of computer readable instructions, data structures, program modules and other data. In the exemplary embodiment, the combination of computer readable instructions, data structures, program modules and other data on a single removable medium provides a system-wide skin with the functionality described herein.

Although the exemplary environment described herein employs hard disk 160, removable magnetic disk 129, and removable optical disk 131, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of base system level program modules are stored on the hard disk 160, ROM 124 or RAM 125 of the computer system. Among these are base operating system (OS) 135, one or more application programs 136, other program modules 137, and program data 138. In addition to these base system level program modules, additional program modules may be provided on one or more of the memory devices (i.e., hard disk 160, magnetic disk 129, or optical disk 131). As illustrated, these program modules include operating system (OS) files 165, one or more application programs 166, other program modules 167, and program data 168. These latter program modules may provide the functionality of a system-wide skin covering the entire base system level.

For purposes of illustration, base OS 106 is described as a Windows-based operating system, such as Windows XP®, which is a trademark of Microsoft Corp. The functions of the invention are, however, applicable to any operating system that supports the implementation of system-wide skins and related functionality, as described herein. Thus, for example, the invention may also be implemented within a Linux-based OS. Other OSes which may implement the functionality of the invention available include Hewlett Packard's HP-UX®, IBM's AIX®, and Sun's Solaris®.

A user may enter commands and information into the computer system 100 through input devices such as keyboard 140 and graphical pointing device (mouse) 142. These input devices are often connected to CPU 121 through serial port interface 146 that is coupled to the system bus 123, but may be connected by other interfaces, such as a parallel port, game port or a universal serial bus (USB) or a network interface card. Monitor 147 or other type of display device is also connected to the system bus 123 via an interface, such as video adapter 148. In addition to monitor 147, computer system 100 may include other peripheral output devices, such as speakers and printers (not shown).

Computer system 100 may operate in a networked environment using logical connections to one or more remote computers, such as remote computer 149. Remote computer 149 may be another personal computer, a server, a router, a network PC, a peer device or other common network node. Depending on whether a wide area network (WAN) or local area network (LAN) (simply illustrated via connectors 152 and 151, respectively) is being accessed by computer system 100, the network access may be via modem 154 or network interface 153, respectively. It is appreciated that the network connections shown are exemplary and other means of and communications devices for establishing a communications link between the computers may be used. In a networked environment, program modules providing system-wide skin functionally may be stored in the remote memory storage device and the pointer(s) of the hard drive's device driver redirected to the remote storage device. Thus, as illustrated, remote computer 149 also includes operating system (OS) files 155, one or more application programs 156, other program modules 157, and program data 158.

Finally, while computer system 100 is illustrated with specific hardware and software components, the invention is applicable to any type of computer system configuration so long as the system-wide skin is supported by the system BIOS. However, it is understood that the above described embodiment is merely for illustration and not meant to imply any limitations on the actual structural design/configuration of the computer system in which the invention is practiced. Further, depending on implementation, it is understood that the functional features of the invention may be programmed into the system BIOS and or OS or provided as a utility for enabling system-wide skins.

Hard Disk Drive with Port and Firmware for Enabling (Removable) System-Wide Skin Several different hardware configurations are presented for implementing the invention. In the first configuration, a single device driver is utilized to manage two or more devices, where the first device is the base system drive and the second (and other) device(s) is the drive supporting the system-wide skin. This first configuration enables portability of the system-wide skin. In another configuration, a single physical drive is provided, with a physical and/or logical partition separating the program modules of the base system from those of a internalized system-wide skin. The device driver points to the address of the skin's logical partition for all read/write operations performed while the skin is in place. For simplicity, such a skin is referred to as an internalized skin to distinguish it from an external skin provided by/on a separate, removable drive/medium from the base system drive. As illustrated below, both configurations may co-exist within a single computer system to provide multiple levels of skins.

Figure 4A:
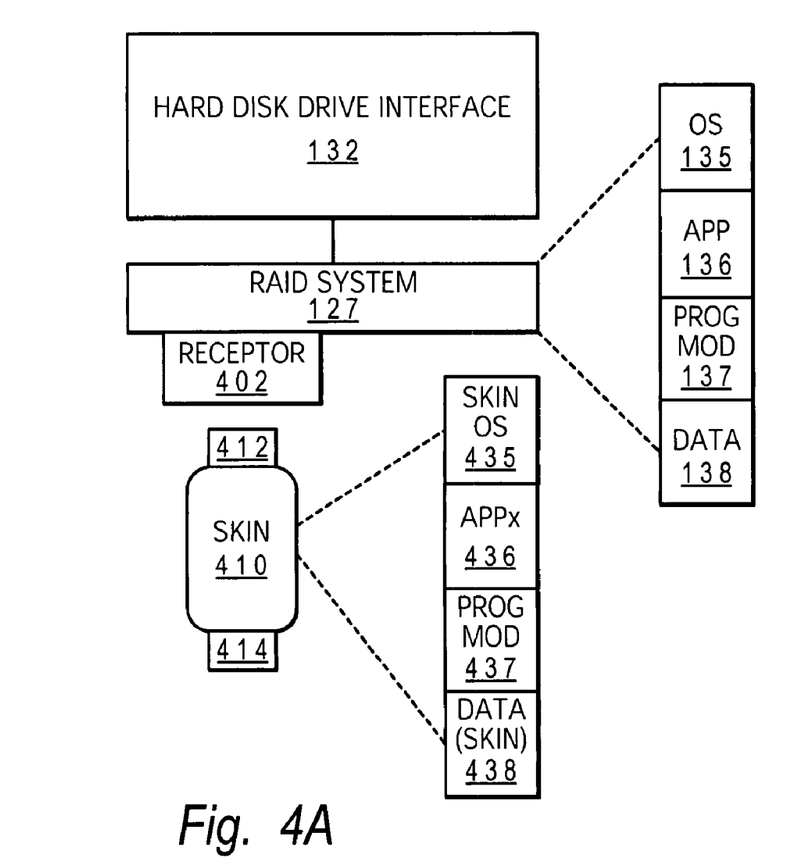
FIGS. 4A and 4B are block diagram representations of a hard drive subsystem with hardware support for removable skin media according to two embodiments of the invention.
Figure 4B:
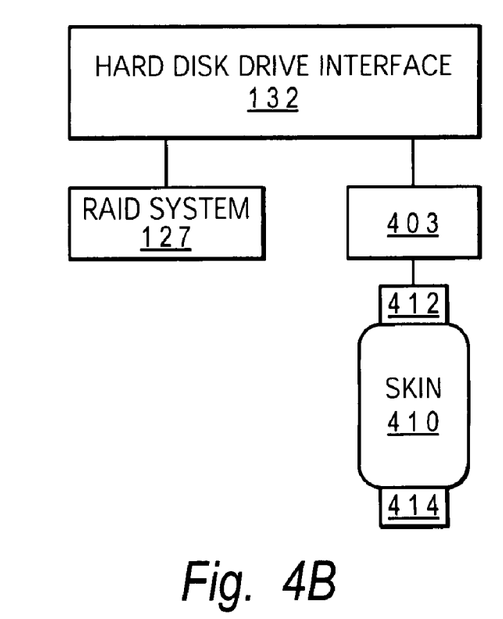

One hardware configuration that supports the implementation of an external, system-wide skin includes configuring/designing a hard disk drive interface/controller of the computer system with a skin connection port for connecting a removable medium on which the skin layer may be provided. Two different implementations of this new hard drive design are illustrated by FIGS. 4A and 4B. The first figure illustrates the hard drive itself designed with the capability of supporting a plug-in, removable drive, which may serve as a system wide skin utilized for any number of operations. The second figure illustrates the interface/controller providing the skin connection port. The portable medium connects directly to the hard drive or hard drive controller (interface) of the computer system. The portable medium may be physically removed and ported to another computer system with similarly configured hard disk drive and supporting firmware.

As illustrated by FIG. 4A, hard drive subsystem 400 comprises hard disk drive interface 132 connected to a RAID 127. RAID (or redundant array of independent disks) 127 maintains the software code and data for OS 135, system-wide applications 136, system-wide program modules 137, and program data 138. RAID 127 is a physical structure and includes a receptor/port 402, which is utilized to support connection of a removable skin medium. According to the illustration, removable skin medium 410 comprises a storage device with a interface connection 412 that electrically couples/connects to receptor 402 of RAID 127. Skin medium also includes a multi-level skin port 414 by which an additional skin medium may be coupled to skin medium 410 to provide a multi-level (or nested) skin layout.

The configuration of FIG. 4B provides removable skin medium 410 with interface connection 412 directly connecting to receptor 403 of the hard disk drive interface 132. Support for this and the previous configuration is provided by firmware within hard disk drive interface 132. Firmware within the hard disk drive interface 132 (associated with the skin connection port) registers the connection of the removable skin medium 410 and initiates a system-wide skin utility (also referred to herein as a pass-through block utility), which implements/establishes a system-wide skin that is supported by the BIOS of the computer system.

As further shown in FIGS. 4A and 4B, removable skin medium 410 may include program modules that may be similar to base system (e.g., skin-level OS files/extensions 435, skin-level application 436, skin-level program module 437, and skin program data 438). With this configuration removable skin medium 410 may be utilized as an operating environment skin covering the entire base system, as described below.

Base System Overlay with Multiple Skins

The other drive on which the skin exists may be a built-in secondary drive (e.g., D drive), a removable drive (e.g., S drive) or simply a logical/physical drive partition of the C drive (e.g., C' drive). The specific character names of the particular drives are provided for example only, and not meant to place any limitations on the invention.

Figure 2A:
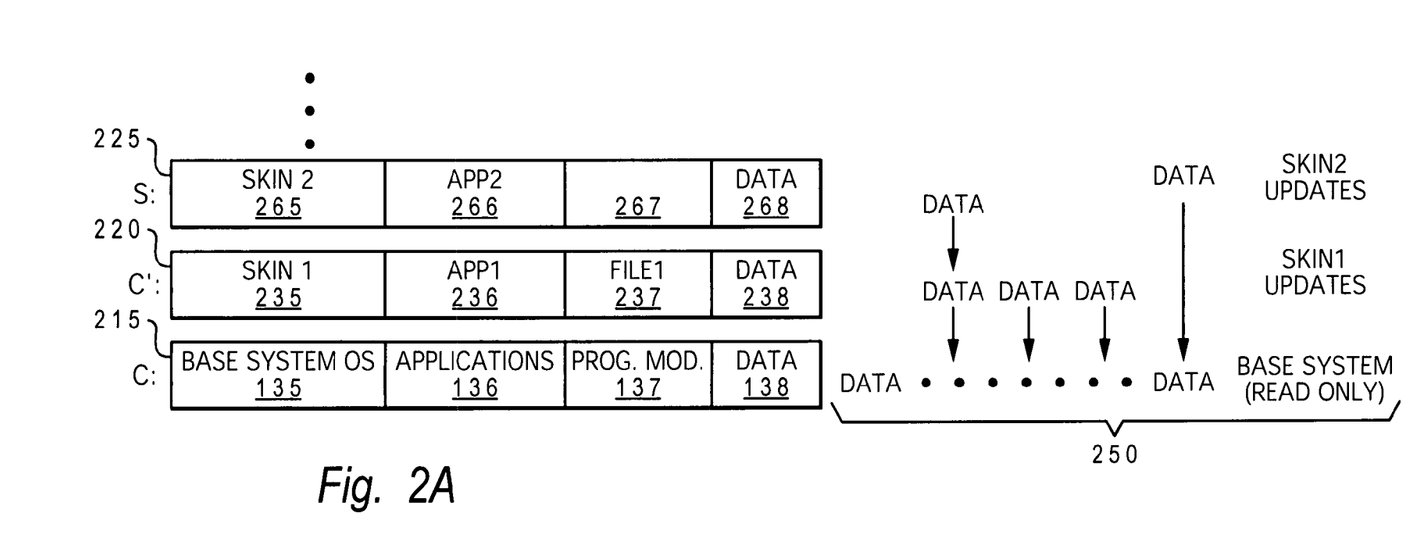
FIG. 2A is a multiple-level representation of OS programs, applications, files, and data of each level of a computer system designed with multiple skin levels covering a base system level according to one embodiment of the invention.
Figure 2B:
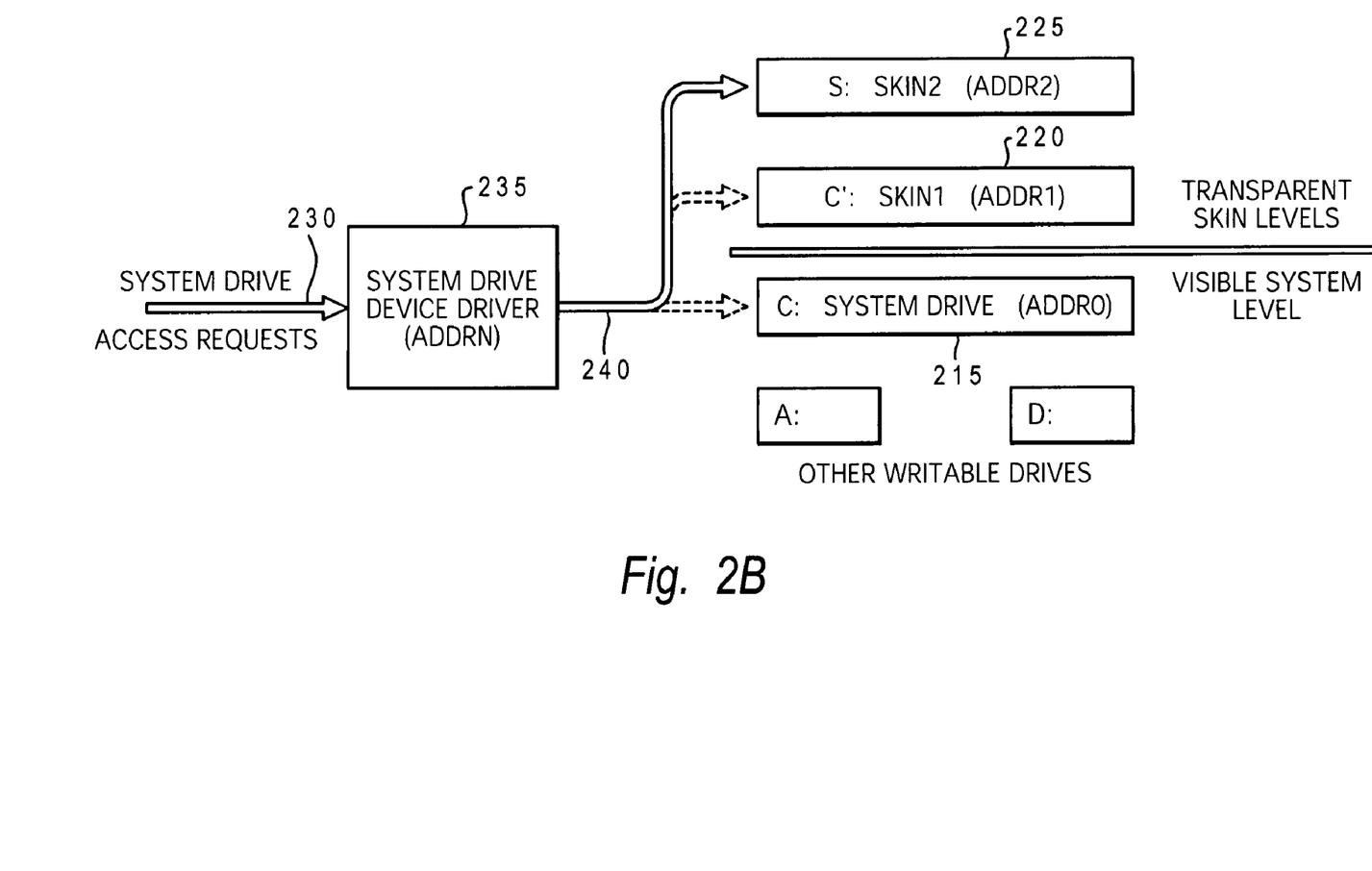
FIG. 2B illustrates the base system device driver pointing to one of the skin levels among the three levels provided by FIG. 2A according to one embodiment of the invention.

As illustrated by FIGS. 2A and 2B, described below, a combination of different, removable media or different partitions on the system drive provides multiple layers of skin that are concurrently added. With these multiple skins available, a pass through block utility is programmed to support/enable nested overlays of skins that create separation of OS data, application data, and user data. With nested overlays that include multiple skins placed over the base system, the user performs all reads/writes/updates at the highest level skin, typically the last skin installed.

FIG. 2A illustrates an exemplary layout of a system having multiple skins. As illustrated in FIG. 2A, base system exists on the C drive. In order to enable an internalized skin on the main system drive, the C drive is physically and/or logically partitioned such that a C' drive is provided. C' drive hosts the internalized skin1 and is illustrated as host skin drive 320. In addition to the host skin drive 320 (or C' drive), the system includes a removable medium, S drive 325. This removable medium provides the external, removable skin 2. Removable medium may be any one of a computer disk (CD), a thumb drive, a USB connected drive with storage media thereon.

Each drive is one of three separate levels. The first level represents base system (C drive) 215, which includes the program modules on the base system drive, such as base system OS 135, and application programs 136. Above base system level 202 is first skin level 220 (internalized skin on C' drive), which also includes first skin OS files 235, Application1 236, file1 237 and data 238. Finally, a second level provides an external/removable skin, skin level 2.225 (on S drive), and includes second skin OS files 265, second skin application2 266, and data 268. Both first and second skin applications 236 and 266 execute to provide a particular them associated with the respective skin. Data 138, which exist at the base system 215 (i.e., on system drive C) is read-only data, while data 238 and data 268 are both read and write able. Application1 236 and application2 266 exist solely within their respective skin level, as do the respective files and data. As shown by the offset drawing 250 to FIG. 2A, the three levels of data 250 may reflect updates to system level data 138 at the specific skin level. According to the invention, however, the updates are retained within their specific skin level and the updates do not change the system level data 138.

Transparency/Invisibility of Skin Layer(s)

The base operating system is not aware that the skin is present because the skin is transparent to the operating system. Application of the skin masks the OS by redirecting the address pointers (i.e., the code within a device driver that identifies the specific physical device to which a read/write operation is to be directed) of the device drivers without alerting the OS of the change. Thus, with respect to FIG. 2A and as further illustrated with FIG. 2B and FIGS. 3A-3B, internalize skin1 212 and removable skin2 222 are transparent to the base operating system 135. The BIOS communicates with each storage device via a device driver. According to the invention, the pass through block utility reprograms the device driver of the system drive to intercept all application and system calls (for access to data) to the system drive and redirect the those calls to the respective storage device that provides the skin.

Only the specific pointers of the device drivers within the BIOS changes, and so from the perspective of the operating system, processing still occurs at the base system level and the processing still accesses and updates the base system drives. FIG. 2B illustrates this redirection of the device driver's pointer (i.e., address/directory at which the drive/storage medium is located). As shown therein, a system drive's device driver 235 has stored therein an address vector, which represents the address of the system drive (e.g., drive C) during regular operation of the computer system without any skin installed thereon. Device driver 235 has associated therewith address pointer 240 (which although illustrated as a physical pointer is actually a representation of the address component within the device driver). Illustrated to the right of device driver are multiple drives, including base system drive C 215 with associated address vector, first level, internalized skin drive 220 with associated skin1 address vector, and second level, external skin drive (S) 225 also with associated address vector.

The BIOS selectively redirects the pointer 240 to point to any one of the drives by changing the address vector within the device driver 235. When the device driver receives an access request 230 targeting the system drive 215, the device driver 235 forwards that access request to the specific drive to which the pointer 240 is presently pointing (i.e., the drive whose address vector is present within the device driver 235). In the provided illustration, the pointer 240 directs the access requests to the external skin drive 225.

Thus, although the access request 230 targets the system drive 215, no modification occurs at the base operating system level (i.e., on the base system drive 215). Rather, all accesses and thus all modifications occur at the highest level skin. Files/data that are modified within the skin level become new/updated files/data within the skin level only (on the skin's storage medium). It should be noted that the above physical representation of device drivers and other components is provided solely for illustration and to enable easier understanding of the features of the invention, which may be completed by firmware/software within the computer system.

As with the implementation that includes a single skin, current updates occur within the highest level skin, i.e., the last skin added on top of the base system. When a user adds a new skin to the system, the system reboots to allow the pass through block utility to change the pointers of the device driver to point to the new skin. This new skin may be installed over an already existing skin and becomes the highest level skin, which takes over all skin functions for the entire computer system.

That is, when accessing applications/data to perform read or write functions, the device driver of the system drive points to the device/drive of the highest level skin to obtain data rather than accessing the base system. Since each skin provides a system-wide overlay, Each skin level protects the base system level and each intermediate skin level from possible corruption from operations (changes/updates/installations) occurring in the skin level immediately above it. As described below, read operations occur at any level at which the data is available beginning with a search at the highest level skin and checking subsequent levels in sequence until the base system is checked (i.e., if data is not found in one of the skin levels).

Figure 7A:
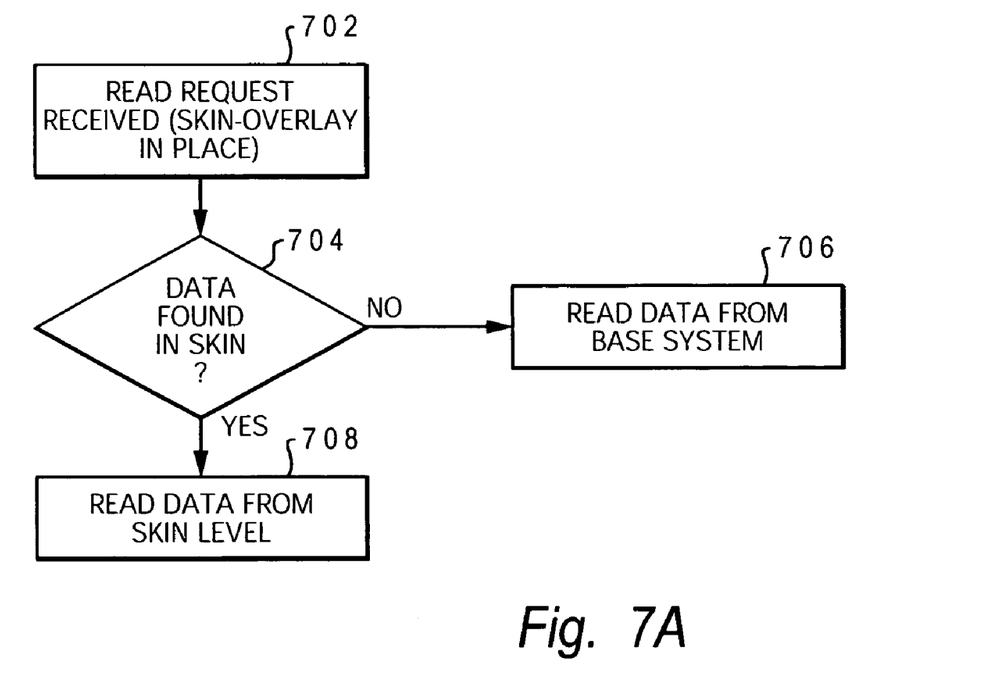
FIGS. 7A and 7B are flow charts of processing read and write operations when a system-wide skin is provided according to two embodiments of the invention.

FIG. 7A illustrates the process of responding to a read operation, while a system-wide skin is present on the computer system. The pass through block utility detects/receives a read operation during the execution of the application at block 702. The pass through block utility directs the BIOS to first check on the skin medium for the requested data. Data retrieval mechanism of the computer system determines, at block 704, whether the data is found on the skin medium. When the data is found on the skin medium, the pass through block utility retrieves the data from the skin medium and forwards the data to the processor, as shown at block 706. However, when the data is not found within the skin level, the pass though block utility generates a search for the data within the base system drive (i.e., C drive), as shown at block 708.

Figure 7B:
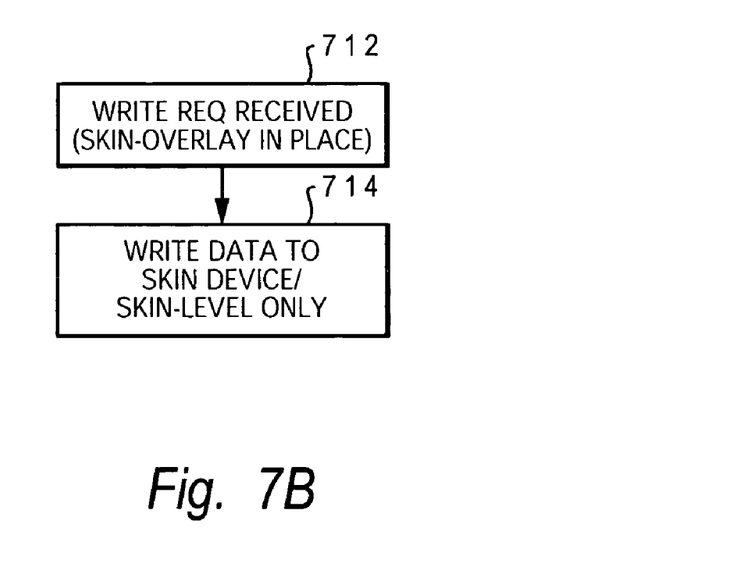

FIG. 7B illustrates the processing of a write operation, while the skin overlay is present in the computer system. The application executing at the skin level generates a write operation at block 712. Once the pass through block utility detects the write operation, while a system-wide skin is present, the pass through block utility completes the write operation on the skin medium, as indicated by block 714. The pass through block utility enables the skin medium to emulate the base system drive, capture all write operations, and forward the write data to a skin drive.

Figure 3A:
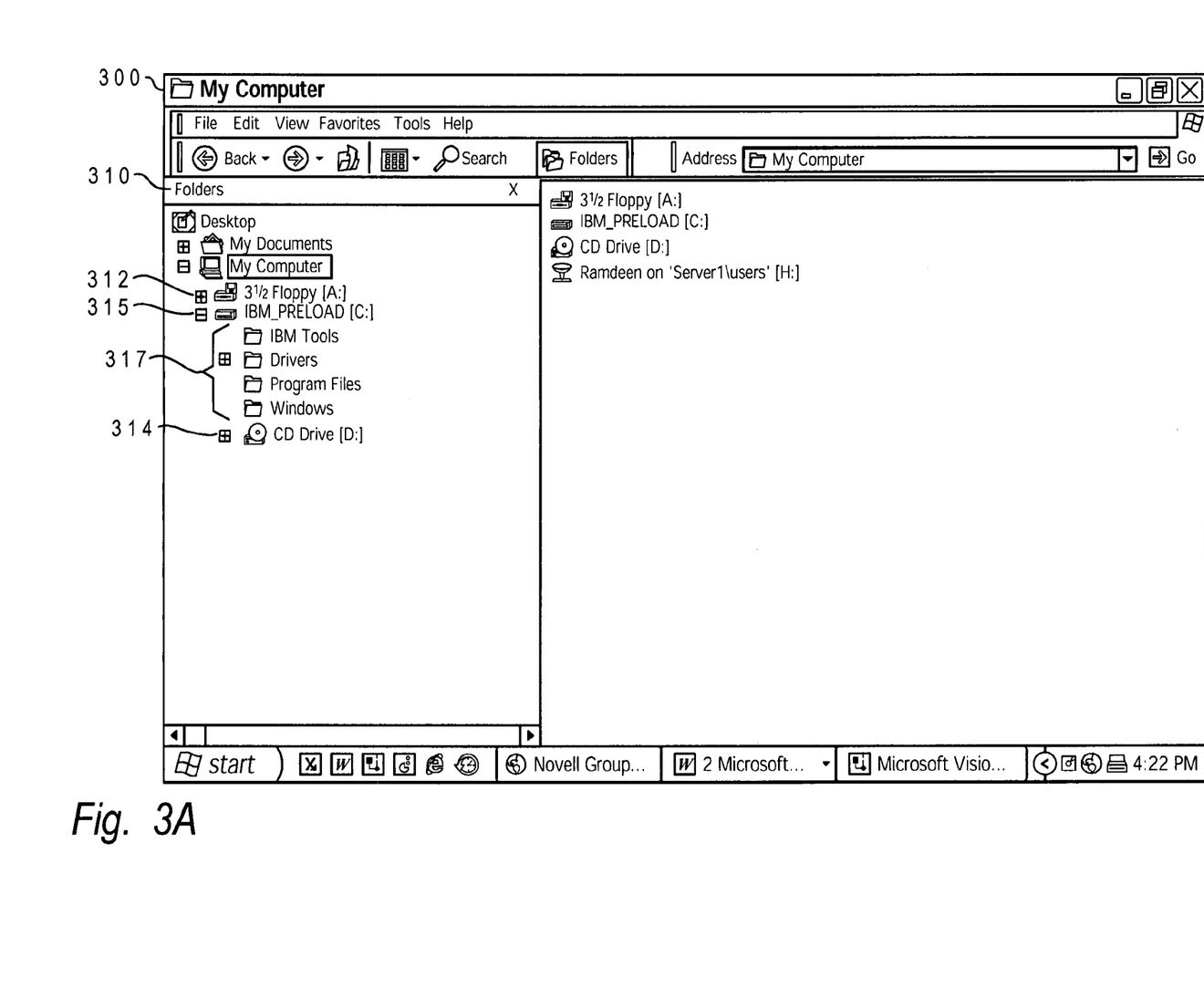
FIGS. 3A and 3B respectively illustrate an exemplary graphical user interface showing the operating system view of the list of viewable directories and a secondary directory view, invisible to the operating system, that provides the additional skin directories, according to one illustrative embodiment of the invention.
Figure 3B:
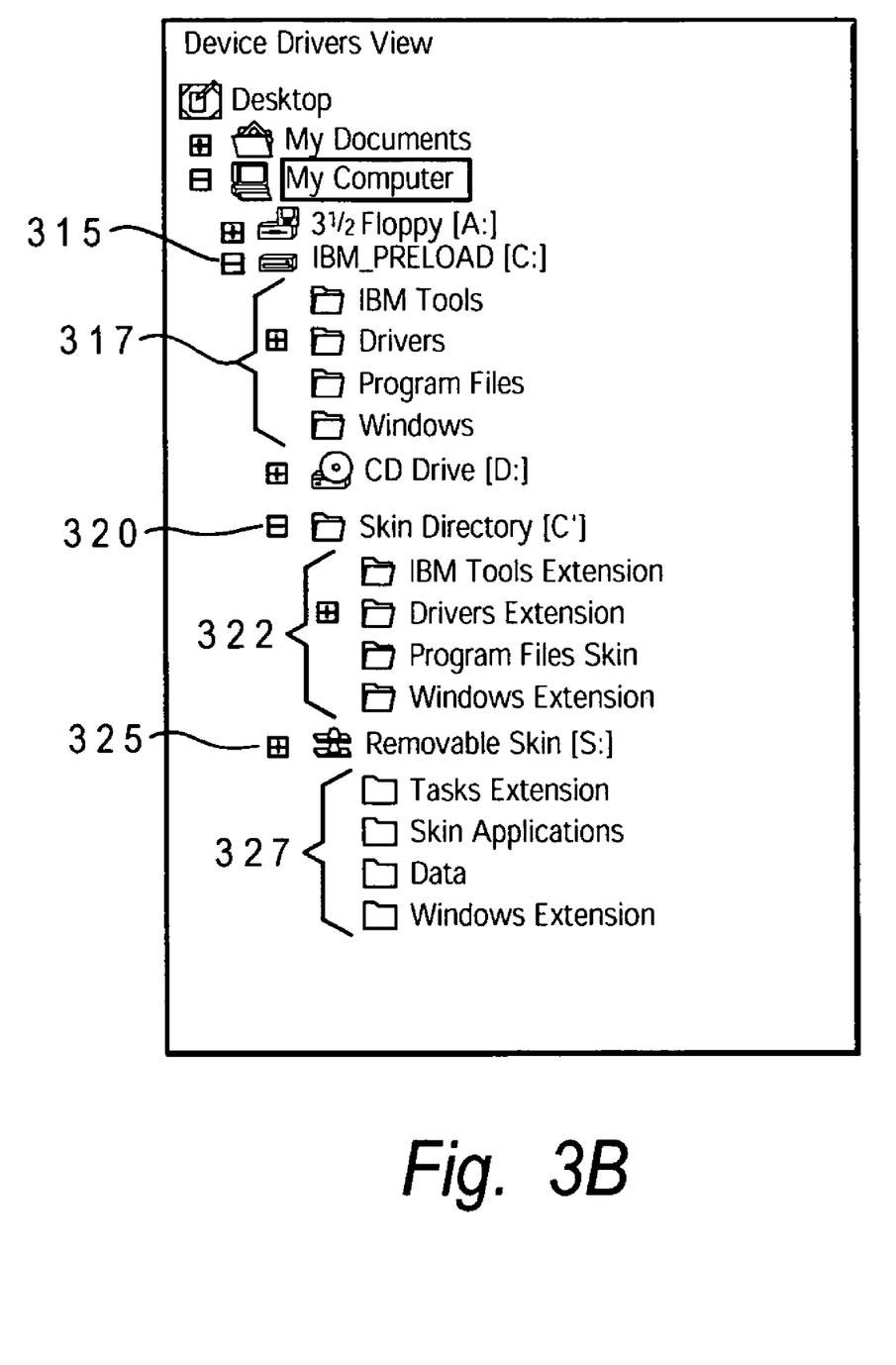

A combination of FIG. 2B and FIG. 3A-3B illustrates in more detail the transparency of the skin levels from the perspective of the OS. FIG. 3A illustrates a graphical representation of visible drives of a computer system, which has been configured with both an internalized and an external, removable skin. Specifically, FIG. 3A provides an OS graphical user interface (GUI) 300 illustrating therein the presence of OS-visible physical drives along with directories associated therewith). OS-visible physical drives include system drive (C:) 215/315, floppy drive (A:) 312, and CD/DVD ROM drive (D:) 314. These drives are also represented in FIG. 2B below the line separating the visible system level from the transparent skin level. In contrast, FIG. 3B illustrates the view from the system BIOS, which includes both the above OS-visible physical drives as well as OS-transparent physical drives on which skins are provided. Separation of the OS-visible drives from the OS-transparent drives is provided by a solid line in FIGS. 2B and 3B. OS-transparent drives include internalized skin drive (C':) 220/320 and external skin drive (S:) 225/325.

When a user opens the folders directory 310, the operating system provides only the OS-visible drives within the directory (FIG. 3A) because the operating system is unaware that the other OS-transparent drives are present as skin drives. Thus, the skin drive is also not visible to the user of the computer system. This feature is useful when a computer owner or system administrator wishes to provide access to the computer system to a secondary user but protect the integrity of the base computer system components from the user's actions. Notably, one embodiment allows a user to select whether to boot up the system with the skin drives visible within the system view and thus boot the base system in skinless mode. The selection may be via a prompt generated by the BIOS, when the BIOS detects the presence of the skin drive. The default configuration is to hide the skin from the system view, but this default maybe overridden by the user during system boot up.

In another embodiment, the user/administrator allows the skin drive overlay/receive all changes made to any of the drives on the base system. The pass through block utility sets up the skin drive as an artificial drive masking the original base system's drives, and the pass through block utility writes all updates to any of the other drives back to the skin drive.

Utility for System-Wide Skin Support

Regardless of the device or drive providing the skin (i.e., either via the above hard drive configurations, a single partitioned hard drive, and/or a separate removable storage medium (on optical drives, for example)), the system-wide pass through block utility supports the establishment of the system-wide skin on the computer system. The pass through block utility triggers the system BIOS to embed within the device driver for the system drive the address vector of the installed skin during boot up of the computer system.

In one embodiment, the pass through block utility presents the base storage device (hard disk) plus removable storage device as a composite device with a single system drive identifier (e.g., "C:") from the perspective of the device driver and other system components. However, the BIOS changes the specific address of the logical partition or skin drive within the device driver and the pass through block utility then forwards all updates intended for the system drive to the removable skin medium 410 rather than update the hard drive itself. In another embodiment, the pass through block utility presents a separate drive identifier (e.g. "C':" or "S:") for the removable storage device than the system drive (C:). Each unique drive identifier shares the device driver of the system drive but has different address vectors and/or associated routing parameters for accessing the particular drive.

According to one embodiment, the base operating system includes the pass-through block utility, which comprises code that redirects all write/update/installation operations bound to the base system drive to a separate drive/storage medium that serves/operates as an overlay (skin) device. The pass-through block device creates a complete system-wide overlay (or skin) on which maybe installed applications, program modules, and data, of a particular theme. For consistency in presenting the invention, the pass through block utility is considered synonymous with a skin utility that supports all the functions required for enabling operation of the system-wide skin.

The period at which the overlay occurs may be during initial boot up of the system or following a subsequent partial boot, depending on implementation. If there is a skin storage media in place during boot up of the system by the BIOS, the BIOS boots the system with the skin as the active execution layer over the base operating system layer (i.e., the device pointers are set to access the skin level during updates). During boot up the BIOS loader hands control over to the pass through block utility to establish the skin drive access protocols (address vectors)

In one embodiment, additional code is provided within the BIOS to allow on-the-fly (post boot up) addition of a system-wide skin to the base operating system layer. This allows the system to perform a partial boot up to the skin layer to recognize the later addition of a system-wide skin. This also enables the BIOS to then begin to restrict any direct user access to the base system level and redirect all access to the installed skin.

In order to support the particular applications provided by the skin, certain system files of the base operating system may be overwritten by similar system files on the skin level. These skin-level system files may provide pseudo-operating system functions. The overwrite operation may occur automatically during set-up of the skin. Thus, when the BIOS detects the skin, the BIOS automatically changes the device pointers within the drivers of the base system devices to point to skin-level components (drive or application) rather than base system components (e.g., system drive). From a hardware-only standpoint, the BIOS modifies the pointers to point to the storage media that provides the skin (e.g., S drive) rather than the base system drive (e.g., C drive). The BIOS performs this redirection of drives by updating the device driver of the system drive to redirect certain requests (write operations, for example) to another drive.

Operating Environment Skins

In one embodiment, the skin layer provides the basic operating system components (i.e., OS files/extensions or a copy of certain operating system files and/or operating system functionality), as well as the specific applications related to a particular theme to which the skin is geared. The operating system functionality enables the skin to function independent of any base operating system, particularly when the skin is being ported to different computer systems with different operating systems. When the boot operation completes on the computer system, the operating environment provided to the user may appear "different" from that of the base system due to specific customization provided by the operating system extensions and/or application(s) and data provided by the skin. The individual configuration of each of the skins represents a complete operating system view to a user.

In another embodiment, the user installs applications, program modules, and data of a particular theme on the system-wide skin. As illustrated by FIG. 3B, expanded internal and external skin drives may include some overlapping primary folders as base system C drive. Among these folders are operating system extension folder and program files folder (with skin applications). The combination of operating system components on the skin providing support for applications contained on the skin leads to the creation of an operating environment skin. The creation of an operating environment skin provided on a portable medium may then be utilized to change the use/functionality of different computer systems. For example, the presence of operating environment features enables a user to create a games operating environment skin that includes one or more of the user's game applications installed thereon. As another example, the user may utilize the operating environment features to provide a business operating environment overlay that contains all of the user's office-tailored applications installed thereon.

Thus, when the computer system includes a skin device having game applications installed thereon or a financial application installed, the computer system boots up displaying that particular theme to the user. The user thus interacts with the computer system as a game computer system or a financial/business computer system, respectively. Because these overlays may be provided on a removable medium (e.g., CD ROM, DVD, thumb drive, and flash drive), the user is able to switch the operating environment of a standard computer system by connecting/inserting the removable medium containing the desired skin and thus adding or substituting a system-wide skin with independent executable functions.

Processing on Computer System with System-Wide Skin

Figure 5:
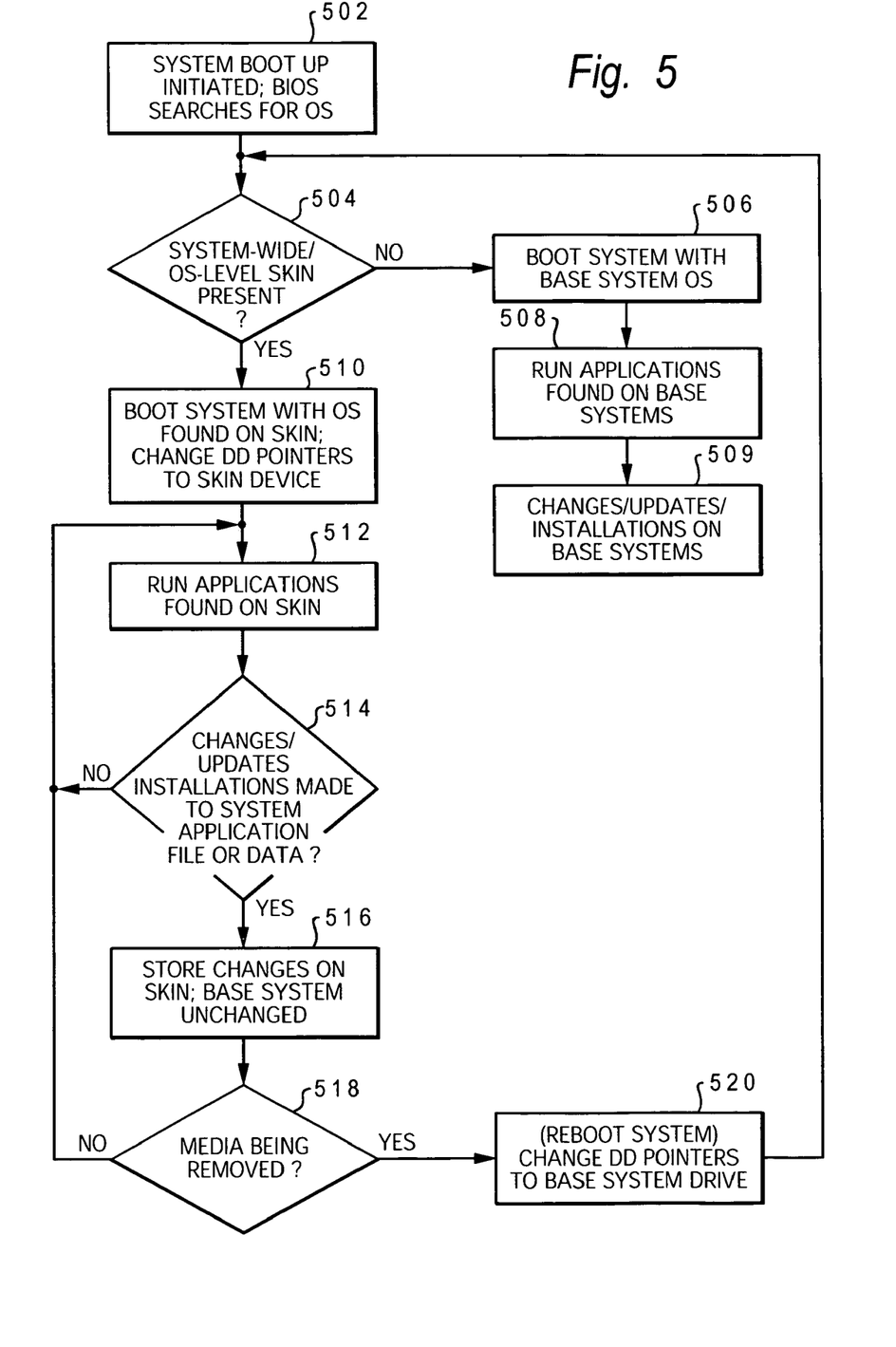
FIG. 5 is a flow chart of the processing/operation of a computer system configured with system-wide skins according to one embodiment of the invention.

With reference now to FIG. 5, there is illustrated a flow chart of the process by which a system-wide skin is provided and utilized. The process begins at block 502 at which the system boots up and the BIOS initiates a search for an operating system and sets/initializes drivers for hardware devices. The pass through block utility checks, at block 504, whether there is a system-wide (operating environment) skin device present. If there is no system level skin present, the BIOS boots the system with the base system OS at block 506. Then the OS runs the applications found on the base system at block 508, and completes any changes/updates to data or application installation on the base system, as shown at block 509.

Returning to block 504, if there is a system-wide skin present, the system boots up at block 510 with device driver pointers changed to point to the skin device. If the skin is an operating environment skin, the OS of the base system merges with any OS extensions (or replacement files) found at the skin level to provide an operating environment supporting the skin applications. The processor executes the applications that are found on the skin level, as shown at block 512. At block 514, the system monitors whether there are any changes or updates to the data or installation of new applications made on the system. When such changes/updates/installations occur, the pass through block utility stores those changes/updates/installations on the skin device, as shown at block 516, and the pass through block utility does not write to the base system device.

The system monitors, at block 518, for the removal of the media on which the skin exists. Removal of the media results in removal of the system-wide skin (i.e., the skin medium removed from the computer system), and the system reboots at block 522. During the reboot, the device driver's address pointer is directed to the base system drive, and the BIOS provides control of the system to the base operating system.

Switchable user skins enable writes into overlays and allow a user to create operating environments which can be utilized to change the use of a computer system. Notably, since these changes/modifications are still within the skin on a removable media, the user is able to port these changes away from the computer and build them on to a different computer system. Thus, one application of the invention allows a computer user to carry/port personal work across different computers and yet view each computer system as specifically configured with his application and updates thereto installed on the present system.

Processing with Nested, Multiple Skins Overlaying Base System

Figure 6:
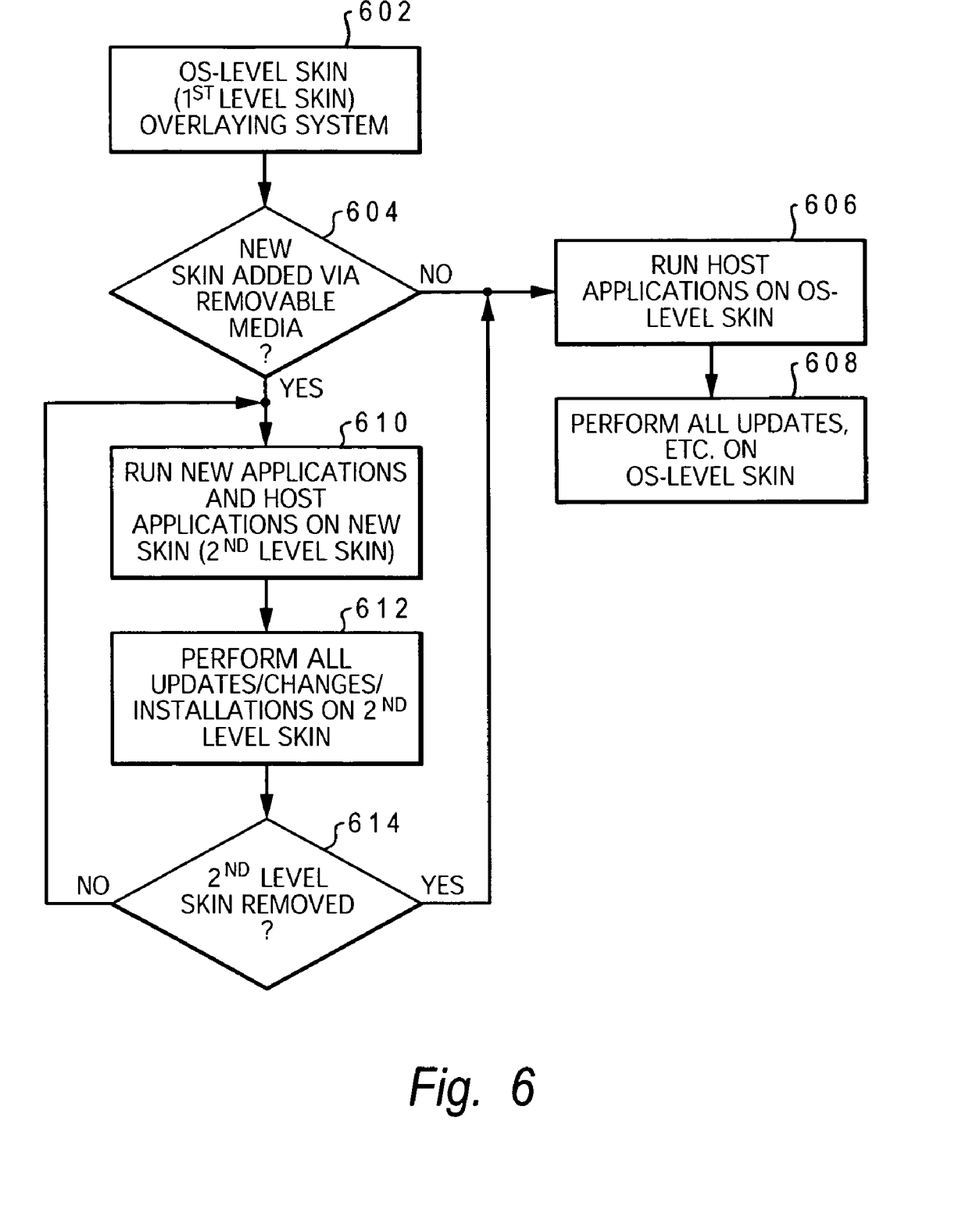
FIG. 6 is a flow chart of the process of installing and using multiple system-wide skins according to one embodiment of the invention.

FIG. 6 illustrates the implementation in which multiple levels of system-wide skin are provided on top of the base system. The process begins at block 602, at which the user installs the first level system-wide skin over the base system. A check is made at block 604 whether a new skin added is on a removable media. The embodiment assumes that the first level skin is an internalized skin on the base system drive or C drive. When the user does not add an additional skin on top of the first level skin, the OS runs system applications on the first level skin as shown at block 606. Following, the pass through block utility performs all updates on the first level skin at block 608.

Returning to block 604, when an additional skin is added (via removable media, for example), the OS runs both the applications of the skin and system applications on this second level skin, as shown at block 610. The pass through block utility performs all updates/changes/installations on the second level skin, as indicated at block 612. The BIOS checks for the removal of this second level skin at block 614. Removal of the medium containing the second-level skin moves all system processes back to the first level skin.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. In a data processing system having a base system with one or more system drives on which is provided a base operating system (BOS), base program applications, files and data, a method comprising:
    installing a system-wide skin over the base system, said system-wide skin logically covering the one or more system drives of the base system, wherein said installing of the system-wide skin comprises:
        dynamically detecting a presence of a skin media having an associated skin drive during a boot up of the data processing system;
        changing a value of a device driver pointer of a basic input output system (BIOS) of the data processing system to point to the skin drive rather than the system drive, wherein all accesses addressed to the system drive are automatically redirected to the skin drive; and
        initializing said base system as a read only level when said skin media is detected, wherein said system-wide skin is utilized for all write access on said data processing system;
        enabling piecemeal setup of the system-wide skin during boot-up of the data processing system, such that privilege levels for reading, writing, and hiding applications, files, data, and directories are provided on a per directory and per skin basis, wherein a user may exercise finer control on the operating environment;
        wherein said skin media is one of (1) a logical partition of the system drive that is hidden from a systems view of available drives and (2) a removable media; and the method further includes enabling portability of the system-wide skin on the removable media;
    wherein said one or more system drives includes a plurality of system and other non-system drives of the data processing system, and said installing provides a system-wide skin overlay of all drives on the data processing system;
    completing all operations performed on the data processing system within the system-wide skin, including BOS-level operations, wherein the base system is not affected by updates and installations made to the data processing system while said system-wide skin is in place, wherein the completing of all operations comprises:
        reading all requests for data from the system-wide skin when the data is available at the system level skin;
        reading the request for data from a lower level skin or said base system only when the data is not available at the current-level of system-wide skin; and
        performing all writing of new data and updates to existing data at the system-wide skin, wherein said base system is read only while said system-wide skin is present;
    wherein said system-wide skin is a first level skin, and said method includes enabling installation of one or more additional levels of system-wide skins on top of a first-level skin, wherein each level skin is a complete system-wide skin that supersedes a level below for performing all write accesses on the data processing system;
    wherein said system-wide skin includes skin-level OS functionality and skin-level applications and data, and the method includes installing said system-wide skin as a complete operating environment over the base system having a specific functionality provided by the skin-level applications, by; (a) overriding BOS functionality with skin-level OS functionality; (b) installing said skin-level applications: and (c) suppressing execution of base system applications,
    booting up said data processing system with the base system; and
    when a BIOS discovers a system level skin during the boot-up process: executing code for subsequently overlaying the system-wide skin over the base system during said booting up; enabling direct access to the said system-wide skin following said booting up without making said system-wide skin visible within the BOS system view; and enabling user override of the visibility of the skin drive to provide said skin drive as another drive of the data processing system within the BOS system view.

* * * * *